UNITED STATES PATENT OFFICE 2,590,019

CHLOROFLUOROCARBON AND METHOD OF MAKING THE SAME

Edward L. Kropa, Old Greenwich, and John J. Padbury, Stamford, Conn., assignors to American Cyanamid Company, New York, N. Y., a corporation of Maine No Drawing. Application May 2, 1947, Serial No. 745,644

5 Claims. (Cl. 260—648)

This invention relates to a chlorofluorocarbon and to a method of making the same. More particularly the invention is concerned with the production of a co-dimer of chlorotrifluoroethylene and 1,1-dichloro-2,2-difluoroethylene, specifically 1,1,2 - trichloropentafluorocyclobutane, the formula for which is

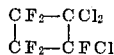

Symmetrical perhalocyclobutanes have been prepared by the self-dimerization of $CF_2{=}CF_2$, $CF_2{=}CCl_2$ and $CF_2{=}CFCl$.

To the best of our knowledge and belief, however, it was not known or suggested prior to our invention that 1,1,2-trichloropentafluorocyclobutane could be prepared by the co-dimerization of chlorotrifluoroethylene and 1,1-dichloro-2,2-difluoroethylene. This was quite surprising and unexpected and in no way could have been predicted, especially in view of the fact that 1,2-dichloro-1,2-difluoroethylene does not form a cyclic co-dimer with chlorotrifluoroethylene.

It is an object of the present invention to prepare a new chlorofluorocarbon, more particularly 1,1,2-trichloropentafluorocyclobutane.

Another object of the invention is to prepare a new chlorofluorocarbon which may be used as an intermediate in the preparation of other compounds, for example, other perhalocarbons.

Another object of the invention is to prepare a new chlorofluorocarbon which is useful as a solvent, a chemical intermediate, a heat-transfer medium and for other purposes.

Another object of the invention is to provide a method of making 1,1,2-trichloropentafluorocyclobutane by a method which is efficient and relatively simple and inexpensive.

Other objects of the invention will be apparent to those skilled in the art from the following more detailed description.

The objects of the invention are accomplished by effecting co-dimerization under heat between 1,1-dichloro-2,2-difluoroethylene and chlorotrifluorethylene, more particularly approximately equal molar amounts of each, and isolating the co-dimer (that is, the compound 1,1,2-trichloropentafluorocyclobutane) from the resulting reaction mass, which also contains a dimer of 1,1-dichloro-2,2-difluoroethylene (that is, the compound 1,1,2,2-tetrachlorotetrafluorocyclobutane) and a dimer of chlorotrifluoroethylene (that is, the compound 1,2 - dichlorohexafluorocyclobutane). Instead of using approximately equal molar amounts of each of the starting materials the molar amount of the one may be in excess (e. g. from 1.05 to 1.15 moles in excess) of the molar amount of the other.

Co-dimerization between the reactants may be effected and 1,1,2-trichloropentafluorocyclobutane obtained, for instance, by passing the mixed starting materials in approximately equal molar proportions or with one slightly in molar excess of the other through a reaction zone, more particularly a reaction tube, wherein the mixture is heated, under atmospheric or substantially atmospheric pressure, e. g., at a temperature within the range of about 300° to 700° C. The mixture of reactants is passed through the reaction zone at a rate such that the mixed reactants are at the reaction temperature for a period sufficient to form 1,1,2-trichloropentafluorocyclobutane, which then is isolated, e. g., by distillation.

Alternatively, 1,1,2-trichloropentafluorocyclobutane may be produced by effecting co-dimerization between approximately equal molar amounts (or with the one slightly in molar excess of the other) of 1,1-dichloro-2,2-difluoroethylene and chlorotrifluoroethylene while the reactants are in the gaseous state, under superatmospheric pressure and at a temperature above the critical temperature of the mixed reactants, and isolating 1,1,2-trichloropentafluorocyclobutane from the resulting reaction mass.

In accordance with a preferred embodiment of our invention 1,1,2-trichloropentafluorocyclobutane is prepared by heating together, at a temperature above the critical temperature of the mixed reactants and within the range of about 150° to about 300° C., and under a superatmospheric pressure of about 100 to about 5000 pounds per square inch, a mixture of approximately equal molar amounts (or with the one slightly in molar excess of the other) of 1,1-dichloro-2,2-difluoroethylene and chlorotrifluoroethylene. Heating is continued for a period sufficient to form 1,1,2 - trichloropentafluorocyclobutane, which in some cases may be a matter of only several hours while in others may be 30 or 40 or more hours, depending largely upon the particular temperature employed. Good results ordinarily are obtained by using temperatures of the order of about 175° to 225° C., more particularly about 200° C., and pressures within the range of about 400 to about 2000 pounds per square inch in forming the 1,1,2-trichloropentafluorocyclobutane, which then is separated, e. g., by distillation, from the resulting reaction mass.

"Critical temperature" as used herein and in the appended claims has the meaning commonly understood in physical chemistry, that is, the maximum temperature at which the phenomena of liquefaction may be observed; in other words, the temperature above which no pressure will cause a gas to separate into two portions or phases, one liquid and the other gaseous.

In order that those skilled in the art better may understand how the present invention may be carried into effect, the following examples are given by way of illustration and not by way of limitation. All parts are by weight.

*Example 1*

|  | Parts | Approx. Molar Ratio |
|---|---|---|
| 1,1-Dichloro-2,2-difluoroethylene | 133 | 1.0 |
| Chlorotrifluoroethylene | 131 | 1.12 |

A stainless steel autoclave cooled in an ice bath was charged with 133 parts of 1,1-dichloro-2,2-difluoroethylene. The autoclave was then closed, cooled in Dry Ice (solid carbon dioxide) to −78° C., evacuated and then 131 parts of chlorotrifluoroethylene was distilled in. The autoclave was heated at about 200° C. for 18½ hours, during which time the pressure dropped from 1900 to 475 pounds per square inch. The autoclave was cooled to 10° C., and vented into a Dry Ice trap. No low-boiling material was collected in this trap. The reaction mass was a dark brown liquid. Two hundred and forty-seven (247) parts of this liquid was distilled through a 6-bulb Snyder column. After removal of a small amount of unreacted starting material and a forerun composed substantially of 1,2-dichlorohexafluorocyclobutane, approximately 79 parts of crude 1,1,2-trichloropentafluorocyclobutane boiling at 94°–96° C. at atmospheric pressure was obtained. The crude product was redistilled to obtain a purer material boiling at 94°–95° C. (most of it boiled at 94.5° C.) and having a melting point of 31.5°–33.5° C.

*Example 2*

|  | Parts | Approx. Molar Ratio |
|---|---|---|
| 1,1-Dichloro-2,2-difluoroethylene | 133 | 1.0 |
| Chlorotrifluoroethylene | 122 | 1.06 |

Essentially the same procedure was followed as described under Example 1 with the exception that the time of heating at about 200° C. was 16 hours, during which time the pressure in the autoclave dropped from 1600 pounds to 425 pounds per square inch. The yield of 1,1,2-trichloropentafluorocyclobutane was approximately the same as was obtained in the prior example.

*Example 3*

This example illustrates the use of 1,1,2-trichloropentafluorocyclobutane as a chemical intermediate, more particularly in the preparation of 1-chloropentafluoro-1-cyclobutene, the formula for which is $$\begin{array}{c} CF_2-CCl \\ | \quad \| \\ CF_2-CF \end{array}$$

|  | Parts | Approx. Molar Ratio |
|---|---|---|
| 1,1,2-Trichloropentafluorocyclobutane | 98.8 | 1.0 |
| Zinc dust | 45.8 | 1.75 |
| n-Butanol (redistilled) | 227.0 |  |

The apparatus comprised a 3-necked reaction vessel fitted with a dropping funnel, a mercury-sealed stirrer, an opening for a thermometer and a 3-bulb Snyder column, which latter was connected to a condenser for distillation. The zinc and approximately 146 parts of the butanol were added to the vessel, after which the 1,1,2-trichloropentafluorocyclobutane dissolved in the remainder of the butanol was added through the dropping funnel to the contents of the reaction vessel, which previously had been heated to 110° C. No reaction occurred until about 15 minutes after the first increment of trichloropentafluorocyclobutane had been added to the vessel, after which a vigorous reaction took place. When the initial reaction had subsided, the remainder of the trichloropentafluorocyclobutane was slowly added over a period of 30 minutes. The reaction vessel was maintained at 105°–110° C., and 57 parts of crude 1-chloropentafluoro-1-cyclobutene, boiling at 33°–38° C. at atmospheric pressure, was obtained. This corresponds to approximately 80% of the theoretical. The crude product was redistilled to obtain 49 parts of a purer material boiling at 33°–33.4° C. at atmospheric pressure and having a refractive index of 1.3208 at 25° C.

The 1-chloropentafluoro-1-cyclobutene of this example may be polymerized alone, or it may be copolymerized with other materials. Other possible uses of the material include isomerization to acyclic compounds, or dimerization reactions with itself or with other compounds.

In a manner similar to that hereinbefore described with particular reference to the preparation of a co-dimer of chlorotrifluoroethylene and 1,1-dichloro-2,2-difluoroethylene, other haloethylenes may form co-dimers with, for example, other unsaturated fluorocarbons. Among such starting materials may be mentioned the following:

$$CF_2=CCl_2 + CF_2=CHX$$
$$CF_2=CX_2 + CFCl=CFCl$$
$$CF_2=CFX + CFCl=CFCl$$
$$CF_2=CFX + \begin{array}{c} CF_2-CCl \\ | \quad \| \\ CF_2-CCl \end{array}$$
$$CF_2=CFX + \begin{array}{c} CF_2-CF \\ | \quad \| \\ CF_2-CF \end{array}$$
$$CF_2=CFX + \begin{array}{c} CF_2-CF \\ | \quad \| \\ CF_2-CCl \end{array}$$

where X in the above formulas represents any halogen, as well as $$CF_2=CCl_2 + \begin{array}{c} CF_2-CCl \\ | \quad \| \\ CF_2-CCl \end{array}$$
$$CF_2=CCl_2 + CF_2=CF_2$$
$$CF_2=CFCl + CF_2=CF_2$$
$$CF_2=CCl_2 + CF_2=CF-CF_3$$
$$CF_2=CFCl + CF_2=CF-CFCl-CF_2Cl$$
$$CF_2=CCl_2 + CF_2=CF-CFCl-CF_2Cl$$

We claim:
1. 1,1,2-trichloropentafluorocyclobutane.
2. The method of preparing 1,1,2-trichloropentafluorocyclobutane which comprises heating together, at a temperature above the critical temperature of the mixed reactants and within the range of about 150° to about 300° C., and under a superatmospheric pressure of about 100 to about 5,000 pounds per square inch, a mixture of approximately equal molar amounts of 1,1-dichloro-2,2-difluoroethylene and chlorotrifluoroethylene, said heating being continued for a period sufficient to form 1,1,2-trichloropentafluorocyclobutane, and isolating 1,1,2-trichloro- pentafluorocyclobutane from the resulting reaction mass.

3. A method as in claim 2 wherein the temperature is about 200° C. and the pressure is within the range of about 400 to about 2000 pounds per square inch.

4. The method of preparing 1,1,2-trichlopentafluorocyclobutane which comprises heating together, at about 200° C. and under a superatmospheric pressure ranging from 1900 pounds per square inch down to 425 pounds per square inch, a mixture of 1,1-dichloro-2,2-difluoroethylene and chlorotrifluoroethylene in the ratio of 1 mole of the former to from about 1.05 to about 1.15 moles of the later, said heating being continued for a period at least sufficient to form a substantial amout of 1,1,2-trichloropentafluorocyclobutane, and distilling the resulting reaction mass to separate therefrom 1,1,2-trichloropentafluorocyclobutane.

5. The method which comprises heating together, at about 200° C. under a superatmospheric pressure ranging from 1900 pounds per square inch down to 425 pounds per square inch, a mixture of 1,1-dichloro-2,2-difluoroethylene and chlorotrifluoroethylene in the ratio of 1 mole of the former to from about 1.05 to about 1.15 moles of the latter, said heating being continued for a period of the order of 16 to 18½ hours, and distilling the resulting reaction mass to collect separate fractions one of which is composed substantially of 1,2-dichlorohexafluorocyclobutane and another of which is crude 1,1,2-trichloropentafluorocyclobutane, and purifying the latter by redistillation.

EDWARD L. KROPA.
JOHN J. PADBURY.

REFERENCES CITED

The following references are of record in the file of this patent:

UNITED STATES PATENTS

| Number | Name | Date |
|---|---|---|
| 2,384,821 | Downing et al. | Sept. 18, 1945 |
| 2,404,374 | Harmon | July 23, 1946 |
| 2,462,345 | Barrick | Feb. 22, 1949 |

FOREIGN PATENTS

| Number | Country | Date |
|---|---|---|
| 796,026 | France | Jan. 17, 1936 |

OTHER REFERENCES

Henne et al., J. A. C. S., 69, 279 to 281 (1947).